(12) United States Patent
Koito et al.

(10) Patent No.: US 10,761,341 B2
(45) Date of Patent: Sep. 1, 2020

(54) DISPLAY DEVICE

(71) Applicant: Japan Display Inc., Minato-ku (JP)

(72) Inventors: Takeo Koito, Tokyo (JP); Yudai Numata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 129 days.

(21) Appl. No.: 15/702,889

(22) Filed: Sep. 13, 2017

(65) Prior Publication Data

US 2018/0081189 A1 Mar. 22, 2018

(30) Foreign Application Priority Data

Sep. 16, 2016 (JP) .................................. 2016-181638

(51) Int. Cl.
*G02B 30/50* (2020.01)
*G02B 30/56* (2020.01)
*G02B 5/136* (2006.01)

(52) U.S. Cl.
CPC ............. *G02B 30/56* (2020.01); *G02B 5/136* (2013.01)

(58) Field of Classification Search
CPC ............................ G02B 27/2292; G02B 5/136
USPC ......................................................... 359/838
See application file for complete search history.

(56) References Cited

U.S. PATENT DOCUMENTS

| 6,967,053 B1* | 11/2005 | Mullen | A42B 3/061 359/529 |
| 7,364,314 B2* | 4/2008 | Nilsen | B29D 11/00605 359/530 |
| 2008/0212182 A1* | 9/2008 | Nilsen | G02B 5/124 359/530 |
| 2017/0031157 A1 | 2/2017 | Koito et al. | |

FOREIGN PATENT DOCUMENTS

| JP | 2011-253128 | | 12/2011 |
| JP | 2011253128 A | * | 12/2011 |
| JP | 2017-32644 | | 2/2017 |

* cited by examiner

*Primary Examiner* — Stephone B Allen
*Assistant Examiner* — Rahman Abdur
(74) *Attorney, Agent, or Firm* — Oblon, McClelland, Maier & Neustadt, L.L.P.

(57) ABSTRACT

According to one embodiment, a display device includes a display module which emits display light, an optical element which transmits or reflects the display light, and a reflective element which retroreflects the display light reflected from the optical element. The reflective element includes a first reflector including a first retroreflective surface having retroreflective properties, a first end portion, and a second end portion which is more separated from the optical element than the first end portion, and a second reflector including a third end portion, which overlaps the second end portion and is closer to the optical element than the second end portion, and a second retroreflective surface having retroreflective properties.

10 Claims, 9 Drawing Sheets

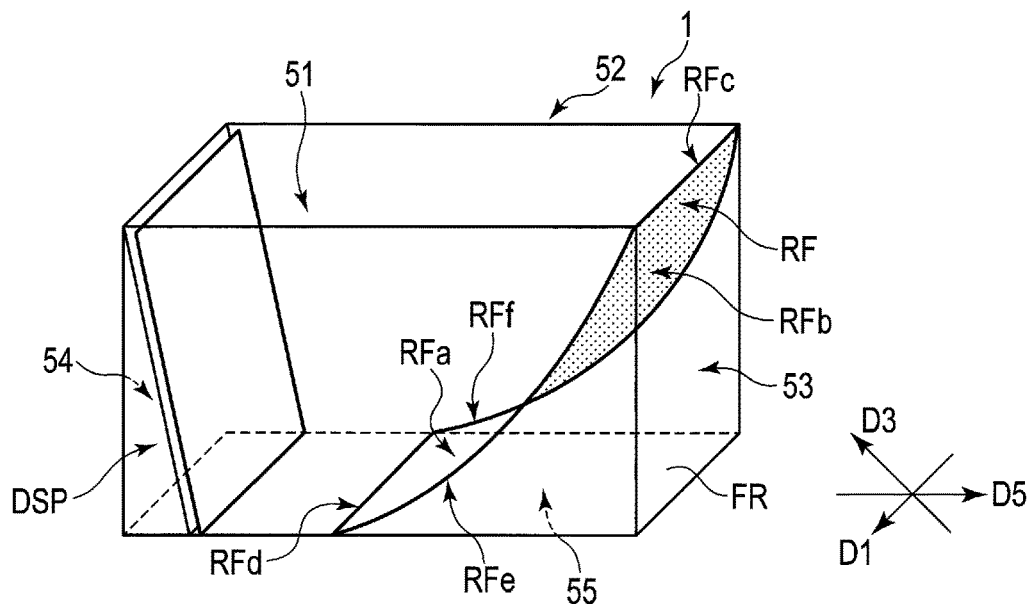
F I G. 5
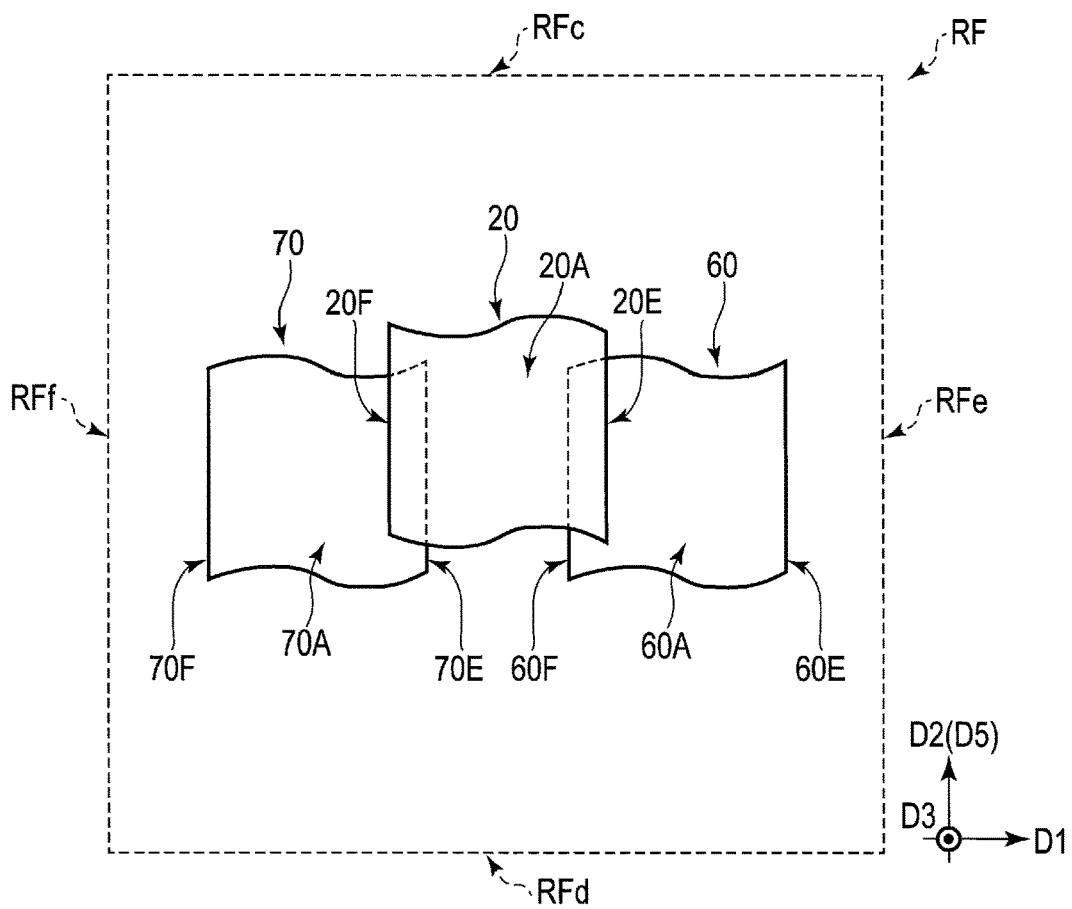
F I G. 6

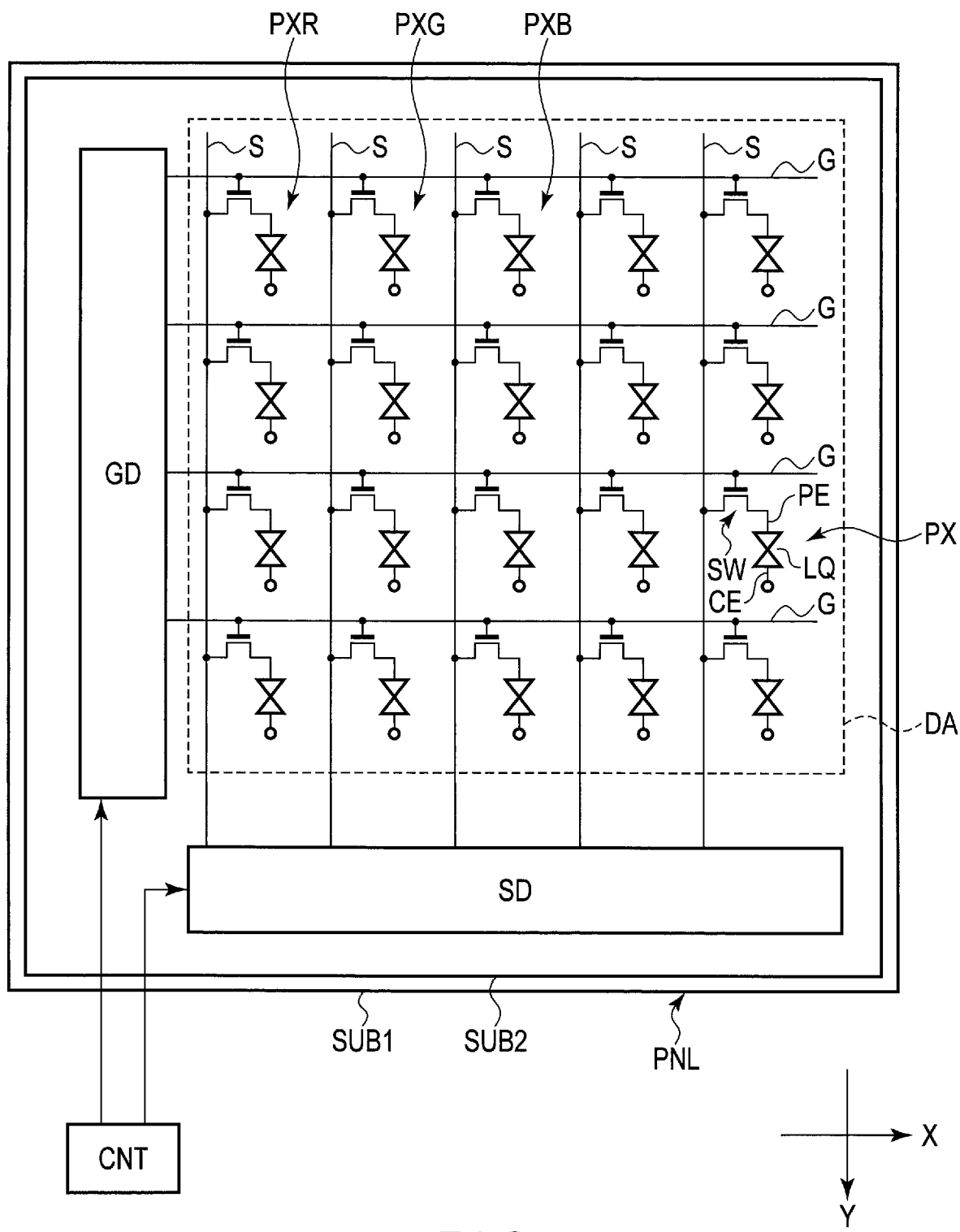
F I G. 7

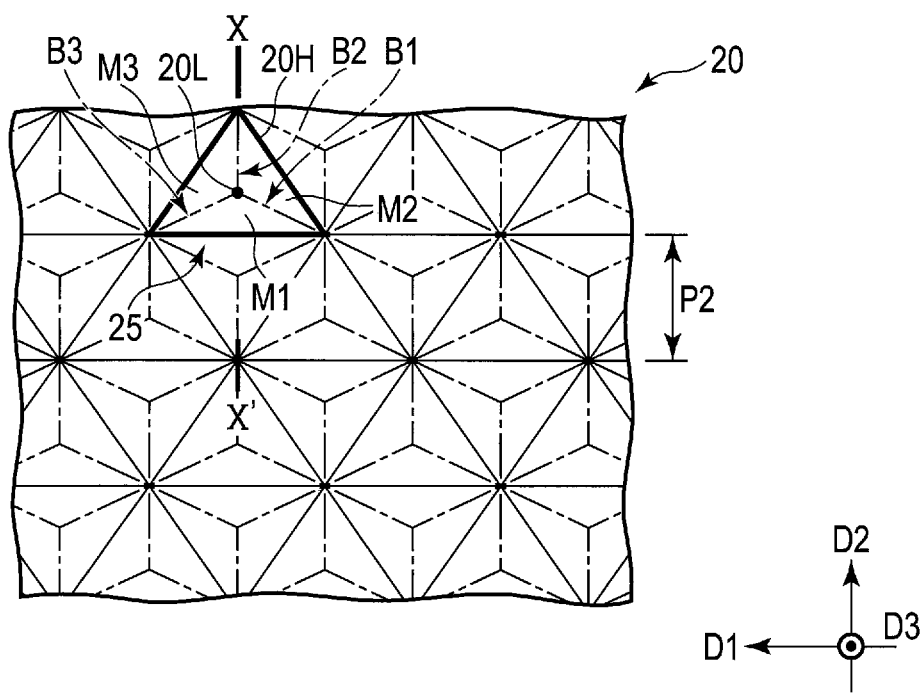
F I G. 9
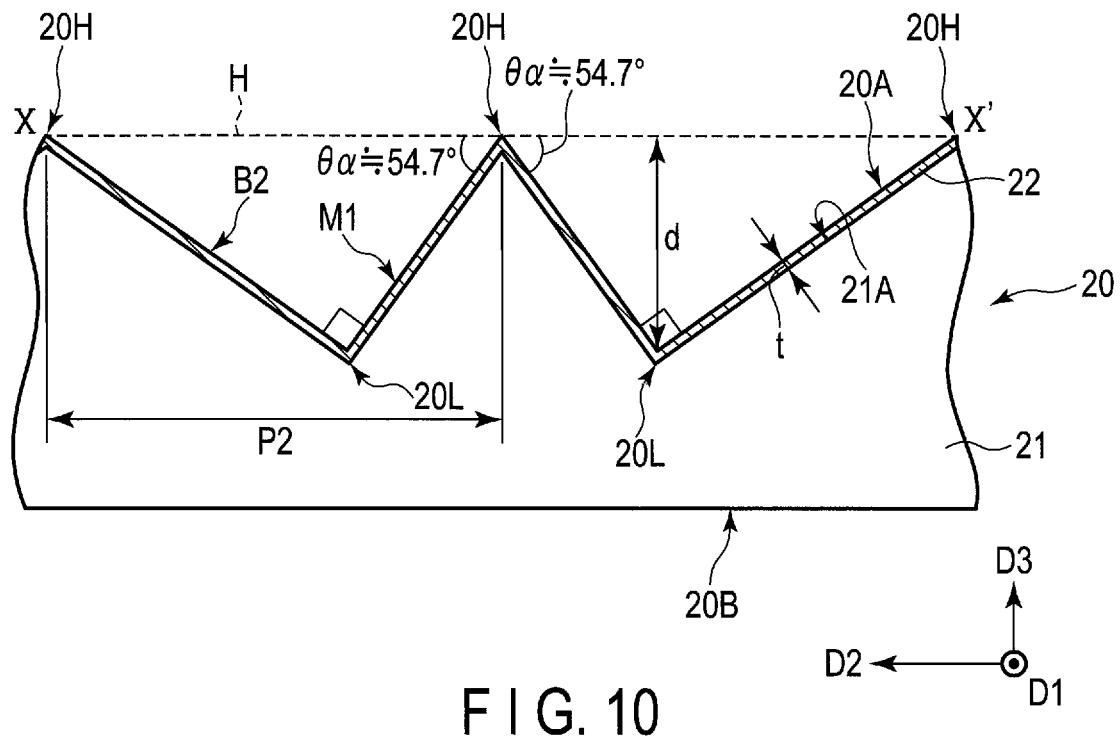
F I G. 10

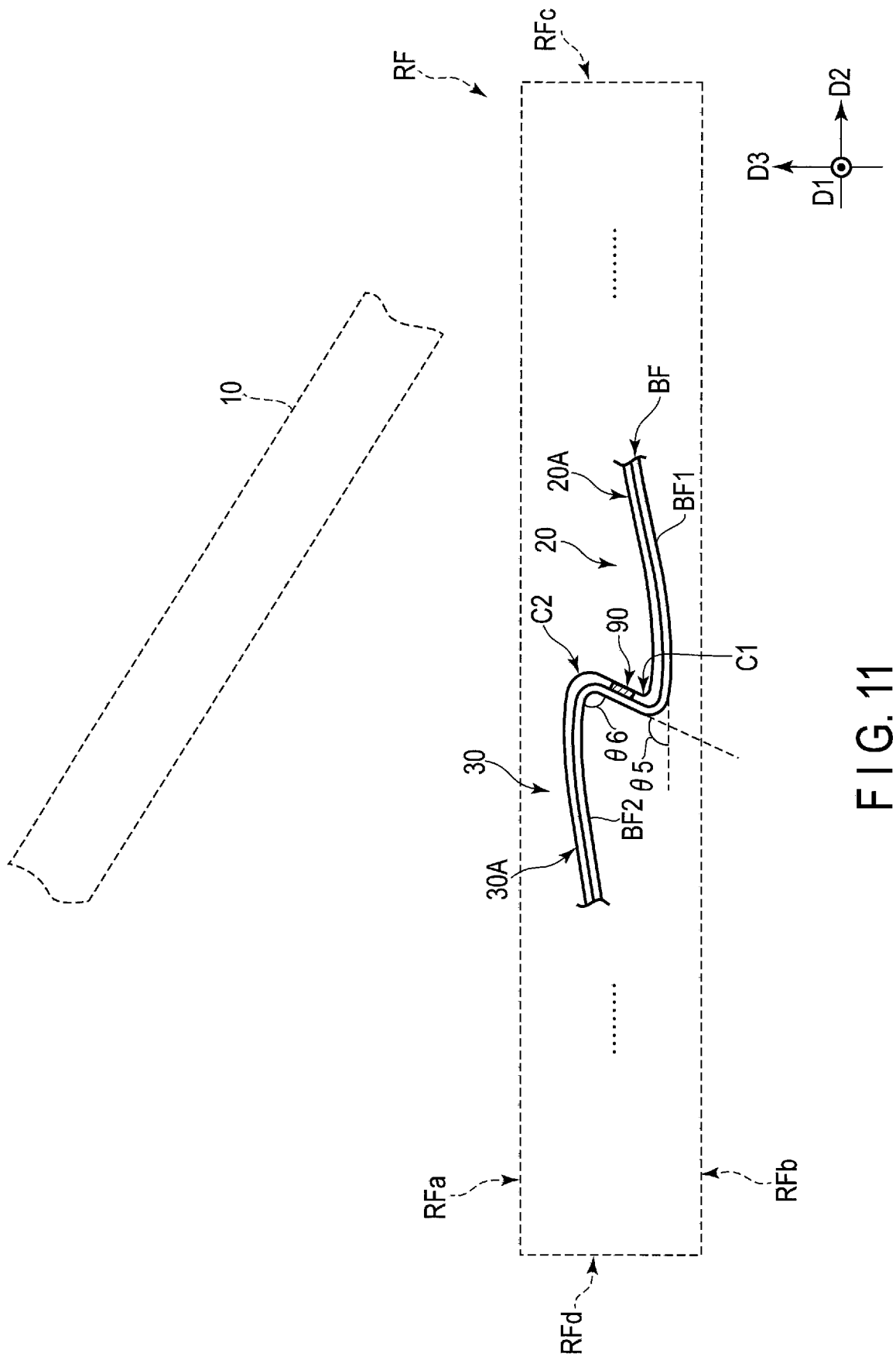
F I G. 11

DISPLAY DEVICE

CROSS-REFERENCE TO RELATED APPLICATIONS

This application is based upon and claims the benefit of priority from Japanese Patent Application No. 2016-181638, filed Sep. 16, 2016, the entire contents of which are incorporated herein by reference.

FIELD

Embodiments described herein relate generally to a display device.

BACKGROUND

As an example of a display device which displays an image in the air, an imaging device whereby display light, which is first polarized light, emitted from a display module is regularly reflected by a reflective polarizing filter, the light is changed into second polarized light and retroreflected by a retroreflective portion, the retroreflected light passes through the polarizing filter, and an image is formed at a position symmetrical to the display module with respect to the polarizing filter, is disclosed.

When the retroreflective portion is constituted of a plurality of reflector plates, the retroreflective properties may be degraded at each joint between the reflector plates.

BRIEF DESCRIPTION OF THE DRAWINGS

FIG. 5 is an illustration showing another configuration example of the display device 1.

FIG. 6 is an illustration showing a configuration example of the reflective element RF shown in FIG. 5.

FIG. 7 is an illustration showing a configuration example of a display panel PNL.

FIG. 9 is an illustration showing a configuration example of a reflector plate 20.

FIG. 10 is a cross-sectional view of the reflector plate 20 taken along line X-X' shown in FIG. 9.

FIG. 11 is an illustration showing a modification of the reflective element RF.

DETAILED DESCRIPTION

Figure 1:
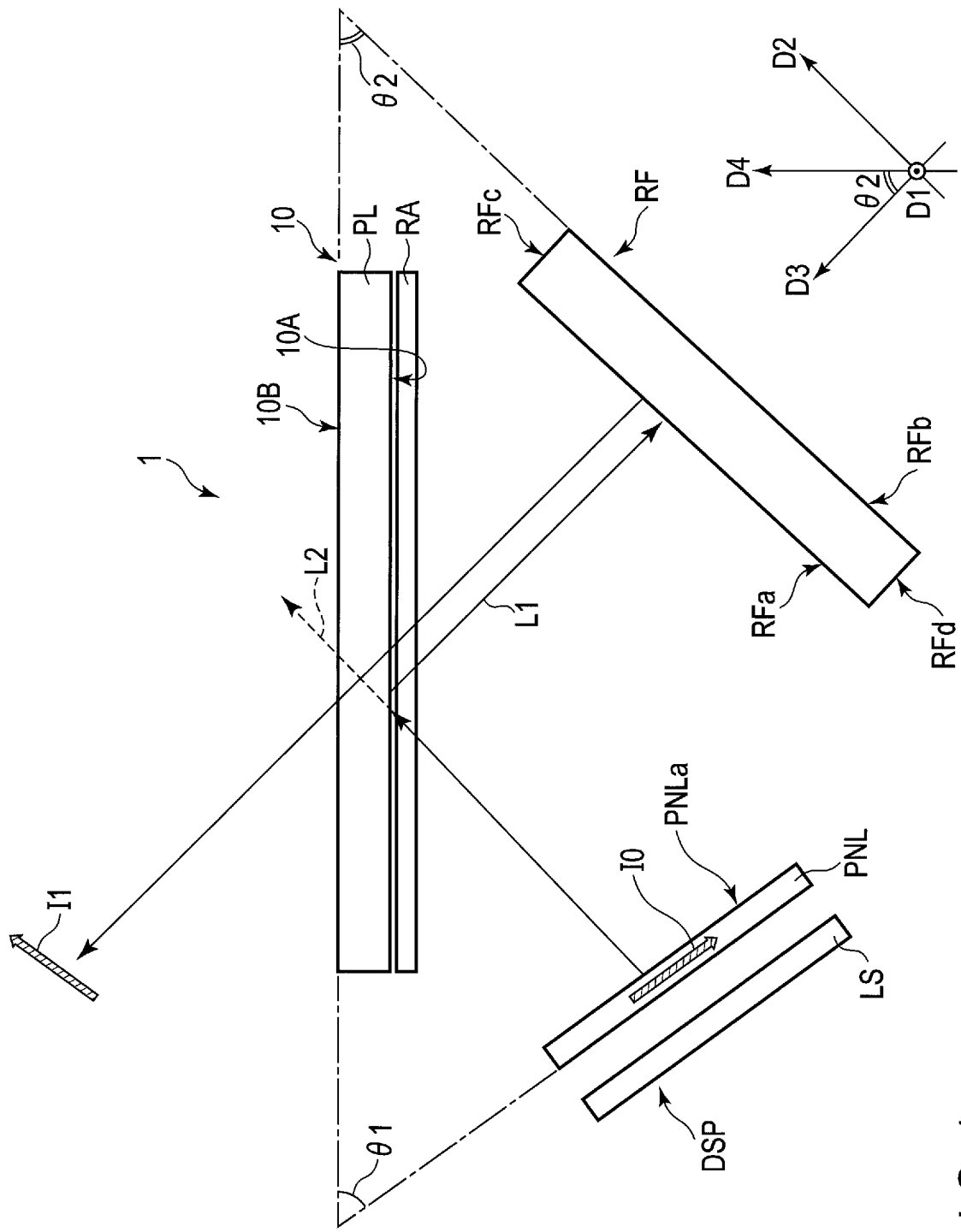
FIG. 1 is an illustration showing a configuration example of a display device 1 according to the present embodiment.

In general, according to one embodiment, a display device includes a display module which emits display light, an optical element which transmits or reflects the display light, and a reflective element which retroreflects the display light reflected from the optical element. The reflective element includes a first reflector including a first retroreflective surface having retroreflective properties, a first end portion, and a second end portion which is more separated from the optical element than the first end portion, and a second reflector including a third end portion, which overlaps the second end portion and is closer to the optical element than the second end portion, and a second retroreflective surface having retroreflective properties.

According to another embodiment, a display device includes a display module which emits display light, an optical element which transmits or reflects the display light, and a reflective element which retroreflects the display light reflected from the optical element. The reflective element includes a first reflector including a first end portion, a second end portion which is more separated from the optical element than the first end portion, and a first retroreflective surface having retroreflective properties which is bent in a convex shape toward the optical element between the first end portion and the second end portion, and a second reflector including a third end portion adjacent to the second end portion, a fourth end portion which is more separated from the optical element than the third end portion, and a second retroreflective surface having retroreflective properties which is bent in a convex shape toward the optical element between the third end portion and the fourth end portion.

According to another embodiment, a display device includes a display module which emits display light, an optical element which transmits or reflects the display light, and a reflective element which retroreflects the display light reflected from the optical element. The reflective element includes a first reflector including a first retroreflective surface having retroreflective properties, a first end portion, and a second end portion, a second reflector including a third end portion, which overlaps the first end portion and is more separated from the display module than the first end portion, and a second retroreflective surface having retroreflective properties, and a third reflector including a fourth end portion, which overlaps the second end portion and is more separated from the display module than the second end portion, and a third retroreflective surface having retroreflective properties.

According to another embodiment, a display device includes a display module which emits display light, an optical element which transmits or reflects the display light, and a reflective element which retroreflects the display light reflected from the optical element. The reflective element includes a single base material, first and second retroreflective surfaces formed on the base material and having retroreflective properties, and a boundary portion located between the first retroreflective surface and the second retroreflective surface. The first retroreflective surface includes a first bent portion, which is bent in a convex shape toward a side separated from the optical element, at a position adjacent to the boundary portion. The second retroreflective surface includes a second bent portion, which is bent in a convex shape toward a side close to the optical element, at a position adjacent to the boundary portion.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, and redundant detailed description thereof is omitted unless necessary.

FIG. 1 is an illustration showing a configuration example of a display device 1 of the present embodiment.

In the example illustrated, direction D2 is a direction orthogonal to direction D1, and direction D3 is a direction orthogonal to directions D1 and D2. However, directions D1 to D3 may cross each other at an angle other than an orthogonal angle.

The display device 1 is an aerial imaging device which forms a display image I1 in the air. A display image I0 displayed on a display module DSP corresponds to an aerial image of the display image I1. The display image I1 is formed at a position symmetrical to the display image I0 with respect to an optical element 10 assumed as a plane of symmetry. The display device 1 comprises the display module DSP, the optical element 10, and a reflective element RF.

The display module DSP emits display light L (L1, L2), and comprises an illumination device LS and a display panel PNL. For example, the illumination device LS is shaped in a rectangle having a pair of mutually opposed edge sides extending in direction D1, and a pair of mutually opposed edge sides extending in a direction intersecting direction D1. As long as the illumination device LS can irradiate light onto the display panel PNL, the structure is not particularly limited. Although detailed explanation of the illumination device LS is omitted, for example, the so-called edge-light-type backlight comprising a light emitting diode (LED) on an end portion of a light guide plate, and the so-called direct-type backlight comprising the LED directly under a diffusion plate can be applied. Light emitted from the illumination device LS may either be unpolarized natural light or polarized light such as linearly polarized light or circularly (elliptically) polarized light.

In the example illustrated, the display panel PNL is a transmissive liquid crystal display panel which displays an image by selectively transmitting incident light, and transmitted light is controlled in units of one pixel by controlling the alignment of a liquid crystal composition by an applied voltage. The display panel PNL is located between the illumination device LS and the optical element 10. The display panel PNL has a display surface PNLa, and a surface opposite to the display surface PNLa faces the illumination device LS. A detailed structure of the display panel PNL will be described later.

Although the display module DSP will be described based on a transmissive liquid crystal display device which displays an image by selectively transmitting light incident on the display panel PNL as an example, the display module DSP is not limited to this. For example, the display module DSP may be a reflective liquid crystal display device which displays an image by selectively reflecting light incident on the display panel PNL, or a transflective liquid crystal display device having both transmissive and reflective functions. Further, the display module DSP may be a self-luminous display device which uses an organic or inorganic LED as a pixel, or a display device employing microelectromechanical systems (MEMS) which controls the reflected light or transmitted light by a mechanical structure. The display module DSP may be a poster or a three-dimensional object.

The optical element 10 transmits or reflects the display light L, and in the example illustrated, the optical element 10 includes a polarizing element PL and a retardation film RA. Of the display light L, display light L2 passes through the optical element 10, and display light L1 is reflected by the optical element 10. The optical element 10 includes an outer surface 10B which is located on a side closer to the display image I1, and an inner surface 10A which is located on a side opposite to the outer surface 10B. The outer surface 10B corresponds to a first outer surface. The inner surface 10A faces the display module DSP and the reflective element RF.

A main surface of the polarizing element PL, which is at the side of the display image I1, corresponds to the outer surface 10B, and another main surface of the polarizing element PL, which is at the side of the display module DSP, corresponds to the inner surface 10A. The polarizing element PL is a reflective polarizer including a transmission axis which transmits first linearly polarized light, and being configured to reflect second linearly polarized light orthogonal to the transmission axis. For example, the first linearly polarized light is a P wave parallel to a plane of incidence, and the second linearly polarized light is an S wave perpendicular to the plane of incidence. The polarizing element PL is composed of, for example, a wire-grid polarizing filter, a reflective polarizing film using a brightness enhancement film, or a multi-layered body obtained by overlapping the reflective polarizing film and an absorptive polarizer. If the polarizing element PL is composed of a multi-layered body of a reflective polarizing film and a transmissive polarizer, the absorptive polarizer is disposed on the reflective polarizing film (i.e., on a side opposite to a side facing the display module DSP and the reflective element RF), and has a transmission axis parallel to that of the reflective polarizing film. If the polarizing element PL includes the absorptive polarizer, it is possible to suppress reflection of external light incident on the polarizing element PL from the side opposite to the side facing the display module DSP, and suppress deterioration in display quality. Also, when the polarizing element PL includes an absorptive polarizer whose degree of polarization is higher than that of a reflective polarizer, a contrast of the display image I1 can be improved.

The retardation film RA is opposed to the polarizing element PL, and is located between the display module DSP and the polarizing element PL, and between the reflective element RF and the polarizing element PL. The retardation film RA is arranged to be substantially parallel to the polarizing element PL, for example. The retardation film RA is, for example, a $\lambda/4$ plate which imparts a phase difference of approximately $\lambda/4$ to the transmitted light. $\lambda$ indicates a wavelength of the transmitted light. Note that the retardation film RA may be a stacked layer body of retardation films having different phase difference values and wavelength dispersion properties. For example, the retardation film RA may be structured by combining a $\lambda/2$ plate and a $\lambda/4$ plate in order to reduce the wavelength dependency. Though the specifics will not be described here, the retardation film RA is disposed such that its slow axis intersects a polarization plane of the linearly polarized light incident on the retardation film RA at an angle of 45°. Therefore, when the light passes through the retardation film RA, linearly polarized light is converted into circularly polarized light, and circularly polarized light is converted into linearly polarized light. The circularly polarized light intended here includes elliptically polarized light.

When the optical element 10 is structured by combining the reflective polarizing element PL and the retardation film RA, the display device 1 can improve the efficiency of use of the display light L, and clearness of the display image I1 can be improved. Also, it is possible to prevent the external light which has proceeded into the display device 1 from being reflected by the display module DSP and the reflective element RF and emitted outside the display device 1, and blurring and glare of the display image I1 caused by the external light can be suppressed. However, the optical element 10 is not limited to a structure including the reflective polarizing element, and may be other types of beam splitters such as a dielectric multilayer film and a half mirror.

The reflective element RF includes an inner surface RFa, which is a main surface located on a side closer to the optical element 10, an outer surface RFb, which is another main surface located on a side opposite to the inner surface RFa, an end surface RFc, which is a side surface located on a side close to the optical element 10, and an end surface RFd located on a side opposite to the end surface RFc. The outer surface RFb corresponds to a second outer surface. Note that the main surface of the reflective element RF is a plane parallel to a D1-D2 plane defined by directions D1 and D2. The end surface of the reflective element RF is a plane parallel to a D1-D3 plane defined by directions D1 and D3, and direction D3 is a normal direction of the inner surface RFa and the outer surface RFb. In the reflective element RF, a retroreflective surface may either be formed of a single element or by arranging a plurality of elements. As long as the reflective element RF has retroreflective properties of retroreflecting the display light L1 reflected from the optical element 10, the structure is not particularly limited. While the retroreflective surface of the reflective element RF has the so-called corner reflector structure having three reflective surfaces that are orthogonal to each other, for example, it may have a spherical structure formed of resin particles, etc.

The optical element 10 is arranged such that it forms angle θ1 with respect to the display panel PNL. Angle θ1 corresponds to an angle formed between the display surface PNLa of the display panel PNL and the first outer surface 10B of the optical element 10. Angle θ1 is not particularly limited as long as the display light L emitted from the display module DSP can enter the optical element 10. In one example, angle θ1 is set to an acute angle greater than 0 degrees and smaller than 90 degrees. If angle θ1 is greater than or equal to 45 degrees and less than 90 degrees, the display light L from the display module DSP can be made incident on the optical element 10 efficiently.

The reflective element RF is arranged such that it forms angle θ2 with respect to the optical element 10. Angle θ2 corresponds to an angle formed between the first outer surface 10B of the optical element 10 and the second outer surface RFb of the reflective element RF, for example. Angle θ2 is not particularly limited as long as the display light L1 reflected from the optical element 10 can enter the inner surface RFa of the reflective element RF. However, from the standpoint of efficiency of retroreflection at the retroreflective surface, it is preferable that the relationship of 0°<θ2<90°, more preferably, 0°<θ2 <45°, should be satisfied. Angle θ2 may change depending on a position of the reflective element RF. In other words, at least a part of the reflective element RF may be curved. Direction D4 is a normal direction of the inner surface 10A and the outer surface 10B of the optical element 10, and is a direction inclined relative to direction D3 by angle θ2 toward direction D2.

Figure 2:
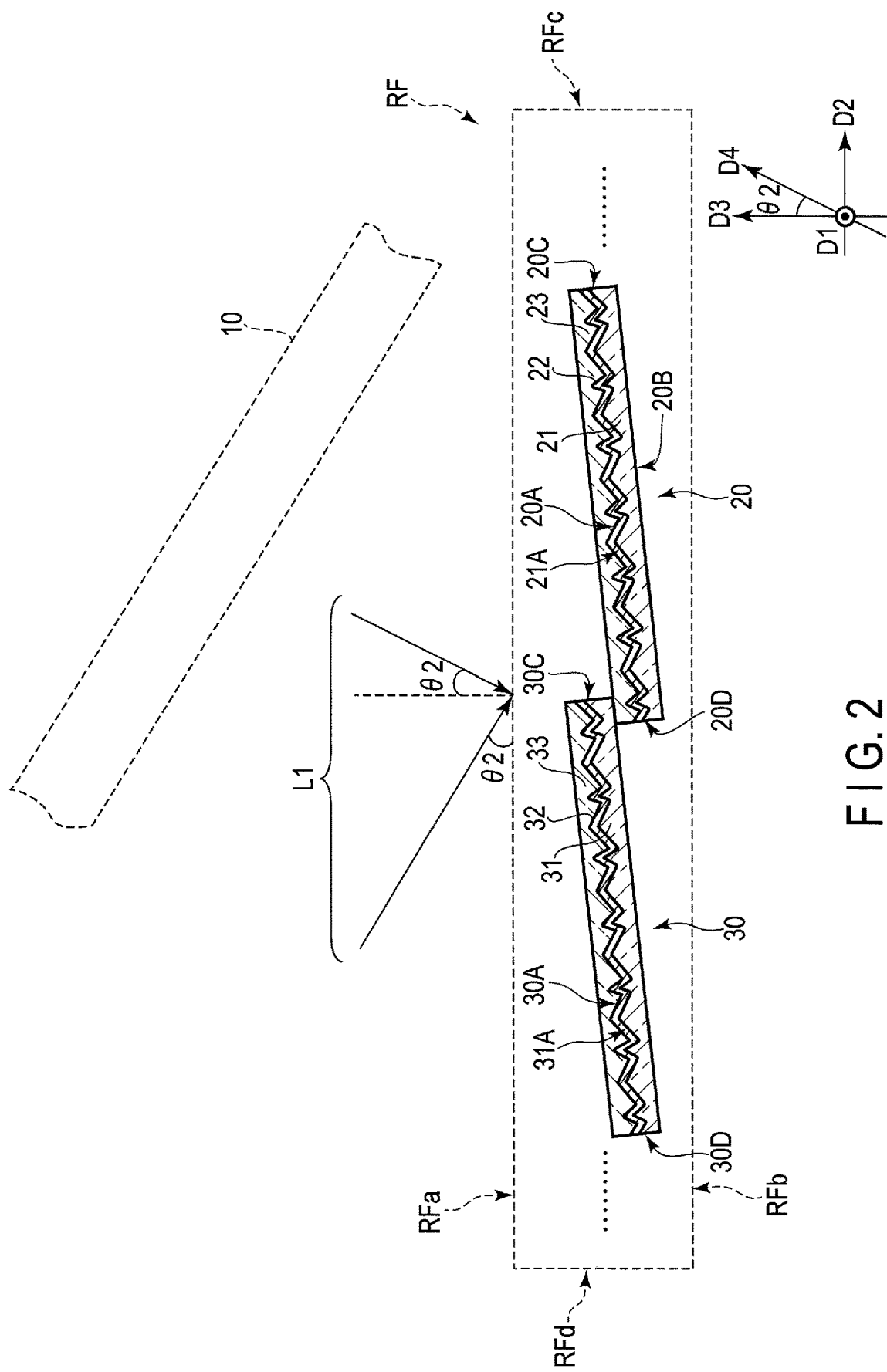
FIG. 2 is an illustration showing a configuration example of a reflective element RF shown in FIG. 1.

FIG. 2 is an illustration showing a configuration example of the reflective element RF shown in FIG. 1. Note that in the drawing, the optical element 10 is depicted by a broken line.

The reflective element RF comprises reflector plates 20 and 30. The reflector plates 20 and 30 are arranged in direction D2, and partially opposed to each other in direction D3 or D4. The reflector plate 20 is closer to the end surface RFc than from the reflector plate 30. The reflector plate 30 is closer to the end surface RFd than from the reflector plate 20. Each of the reflector plates 20 and 30 is formed in a flat plate shape. The reflector plates 20 and 30 have similar structures, and include base materials 21 and 31, metallic thin films 22 and 32, and protective layer 23 and 33, respectively. The metallic thin films 22 and 32 are formed of a material having high light reflectivity such as aluminum or silver. For the metallic thin films 22 and 32, a surface treatment for preventing corrosion or damage may be applied. The protective layers 23 and 33 are formed of an inorganic material such as silicon nitride (SiN) or an organic material such as light transmissive resin, and protect the metallic thin films 22 and 32.

When the base materials 21 and 31 are formed of a material exhibiting light reflectivity, a surface 21A of the base material 21 may form a retroreflective surface 20A, and a surface 31A of the base material 31 may form a retroreflective surface 30A. In this case, in a manufacturing process, a step of forming a layer having light reflectivity, such as a metallic thin film, can be omitted.

A transmittance of the display light L1, which enters the reflective element RF from the optical element 10, on the retroreflective surfaces 20A and 30A is substantially zero, and most of the display light L incident on the retroreflective surfaces 20A and 30A does not reach a back surface 20B of the reflector plate 20 and a back surface 30B of the reflector plate 30. In other words, according to the present configuration example, occurrence of a ghost caused by reflection of light at the back surfaces 20B and 30B can be suppressed.

Alternatively, the reflector plates 20 and 30 may respectively comprise the base materials 21 and 31 on the inner side of the display device 1, and the metallic thin films 22 and 32 on the outer side of the display device 1. In this case, the reflector plates 20 and 30 include flat surfaces (the back surfaces 20B and 30B) on the inner side of the display device 1. Also, in the above case, uneven surfaces corresponding to the retroreflective surfaces 20A and 30A are provided on the outer side of the display device 1.

If the base materials 21 and 31 are adjacent to a material having a different refractive index (for example, air) at the surfaces 21A and 31A, the reflector plates 20 and 30 do not need to include the metallic thin films 22 and 32. In this case, since light incident on the reflective element RF is retroreflected by reflection at each of the surface 21A of the base material 21 and the surface 31A of the base material 31, the surfaces 21A and 31A correspond to the retroreflective surfaces 20A and 30A, respectively.

In the example illustrated, the metallic thin films 22 and 23 form the retroreflective surfaces 20A and 30A. That is, the reflector plate 20 comprises the uneven surface corresponding to the retroreflective surface 20A on the inner side of the display device 1 (i.e., a side closer to the inner surface RFa) at which various optical members such as the retardation film are arranged, and comprises the flat surface corresponding to the back surface 20B on the outer side of the display device 1 (i.e., a side closer to the outer surface RFb). Also, the reflector plate 20 comprises end portions 20C and 20D. The end portion 20C is closer to the end surface RFc than from the end portion 20D. The end portion 20D is more separated from the optical element 10 than the end portion 20C is. A distance between the retroreflective surface 20A and the optical element 10 is gradually increased from the end portion 20C to the end portion 20D. The end portions 20C and 20D include end surfaces at sides close to the end surfaces RFc and RFd of the reflector plate 20, respectively, and correspond to portions which do not have the retroreflection properties, or whose retroreflection properties are lower than that of the retroreflective surface 20A. Similarly to the reflector plate 20, the reflector plate 30 includes the retroreflective surface 30A, the back surface 20B, and end portions 30C and 30D. The end portion 30C is closer to the end surface RFc than from the end portion 30D. The end portion 30D is more separated from the optical element 10 than the end portion 30C is. The end portion 30C overlaps the end portion 20D, and is closer to the optical element 10 than the end portion 20D is. That is, the end portion 30C is located between reflector plate 20 and the optical element 10 or between the retroreflective surface 20A near the end portion 20D and the optical element 10. A distance between the retroreflective surface 30A and the optical element 10 is gradually increased from the end portion 30C to the end portion 30D.

In one example, the reflector plate 20 corresponds to a first reflector plate, and the reflector plate 30 corresponds to a second reflector plate. The retroreflective surface 20A corresponds to a first retroreflective surface, and the retroreflective surface 30A corresponds to a second retroreflective surface. The end portion 20C corresponds to a first end portion, the end portion 20D corresponds to a second end portion, the end portion 30C corresponds to a third end portion, and the end portion 30D corresponds to a fourth end portion.

According to the present configuration example, the end portion 20D is hidden from an optical path of the display light L1 (that is, the light does not illuminate the end portion 20D). Also, the end surface of the reflector plate 30 at a side corresponding to the end portion 30C faces the end surface RFc. Accordingly, the display device 1 can suppress defective image formation including streaks in the display image I1, which is caused by lack of retroreflection of the display light L1 at a joint between the reflector plate 20 and the reflector plate 30. In particular, the display device 1 can reduce a loss of the display light L1 which is incident on the joint between the reflector plate 20 and the reflector plate 30 from a side where the end surface RFd is located. That is, according to the present embodiment, the display device 1 capable of suppressing deterioration in display quality can be provided.

The display light L1 is incident on the reflective element RF in an angle range of less than θ2 inclined relative to the normal direction of the inner surface RFa (direction D3) at the side of the end surface RFc, and in an angle range of less than 90°-θ2 inclined relative to direction D3 at the side of the end surface RFd. Accordingly, when angle θ2 is less than 45°, the display device 1 can more effectively reduce the loss of the display light L1.

Figure 3:
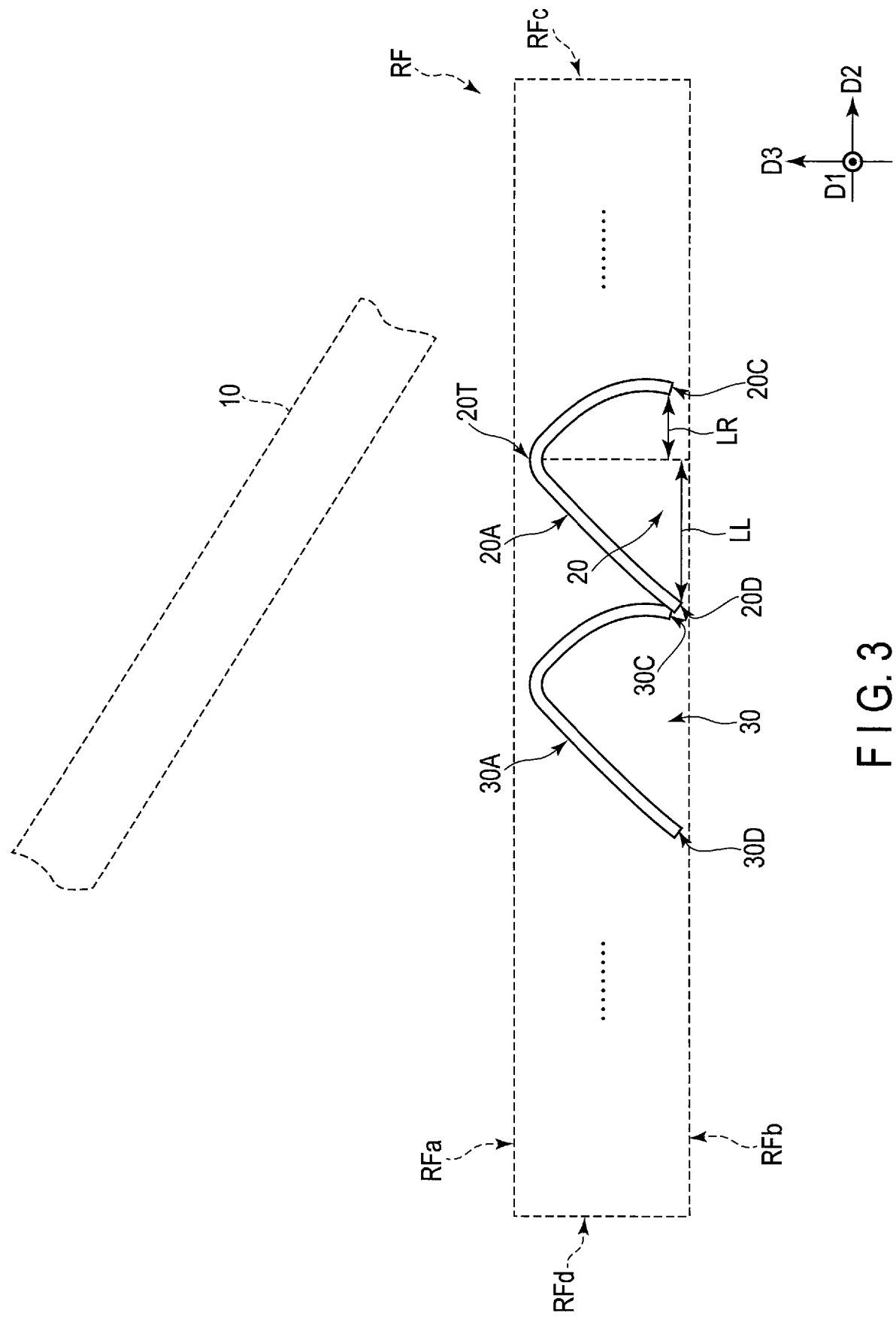
FIG. 3 is an illustration showing another configuration example of the reflective element RF shown in FIG. 1.

FIG. 3 is an illustration showing another configuration example of the reflective element RF shown in FIG. 1.

In the present configuration example, the reflector plates 20 and 30 are bent in a convex shape toward the inner surface RFa. In other words, the retroreflective surface 20A is bent in a convex shape toward the optical element 10 between the end portions 20C and 20D, and the retroreflective surface 30A is bent in a convex shape toward the optical element 10 between the end portions 30C and 30D. In the example illustrated, each of the retroreflective surfaces 20A and 30A is asymmetrical. For example, when the retroreflective surface 20A is noted, the retroreflective surface 20A has a vertex 20T which is most projected. A distance LR between the vertex 20T and the end portion 20C along direction D2 is shorter than a distance LL between the vertex 20T and the end portion 20D along direction D2. As described above, the end portion 20D is more separated from the optical element 10 than the end portion 20C is, and the end portion 30D is more separated from the optical element 10 than the end portion 30C is. Also, the end portions 20C and 20D are more separated from the optical element 10 (the inner surface RFa) as compared to the retroreflective surface 20A, and the end portions 30C and 30D are more separated from the optical element 10 (the inner surface RFa) as compared to the retroreflective surface 30A. The end portion 30C is adjacent to the end portion 20D in direction D2. Preferably, the end portion 20D and the end portion 30C contact each other. Note that if the end portion 20D and the end portion 30C are deviated from the optical path of the display light, the end portion 20D and the end portion 30C may be separated from each other. For example, the end portions 30D, 30C, 20D, and 20C are arranged in direction D2 in this order. That is, the respective end portions of the reflector plates 20 and 30 face the outer surface RFb.

According to the present configuration example, since both of the end portions 20D and 30C are hidden from the optical path of the display light L1, it is possible to suppress reduction of retroreflectance at the joint between the reflector plate 20 and the reflector plate 30, and suppress non-uniformity in display.

Figure 4:
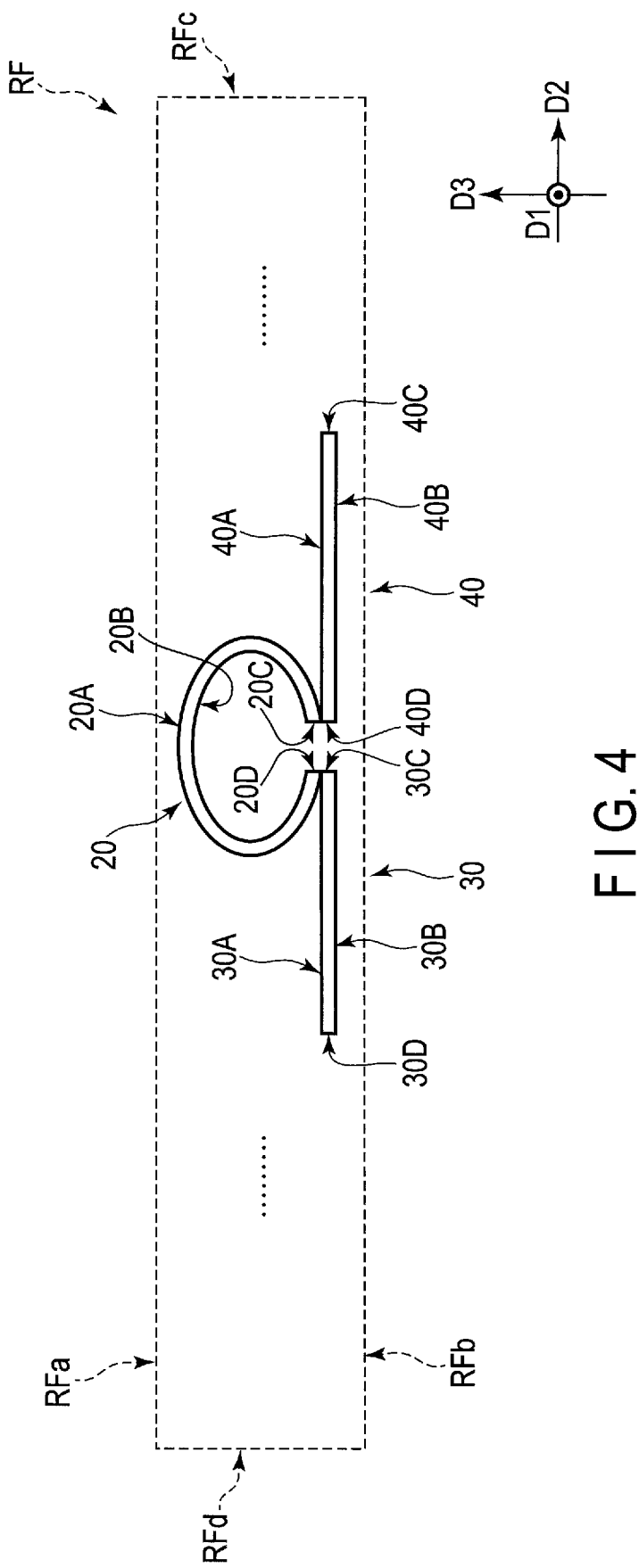
FIG. 4 is an illustration showing yet another configuration example of the reflective element RF shown in FIG. 1.

FIG. 4 is an illustration showing yet another configuration example of the reflective element RF shown in FIG. 1.

In the configuration example illustrated, the reflective element RF further comprises a reflector plate 40. Similarly to the reflector plate 30, the reflector plate 40 includes a retroreflective surface 40A, a back surface 40B, and end portions 40C and 40D. Each of the reflector plates 30 and 40 extends in direction D2. The end portions 40D and 30C are opposed to each other in direction D2. The end portion 20C is opposed to the end portion 40D in direction D3, and the end portion 20D is opposed to the end portion 30C in direction D3. The reflector plate 20 is curved in an arc shape, and the end portions 20C and 20D are opposed to each other in direction D2. The retroreflective surface 20A, which is near the end portions 20C and 20D, faces the end portions 40D and 30C.

According to the present configuration example, in the joint between the reflector plate 20 and the reflector plate 30, both of the end portions 20D and 30C are hidden from the optical path of the display light L1. Also, in the joint between the reflector plate 20 and the reflector plate 40, both of the end portions 20C and 40D are hidden from the optical path of the display light L1. Accordingly, deterioration in display quality of the display device 1 can be suppressed. In addition, since the reflector plates 30 and 40 do not need to be bent, the display device 1 can prevent reduction of the retroreflectance caused by the retroreflective surfaces 30A and 40A being bent, and deterioration in display quality can be suppressed. However, since the reflector plate 20 needs to be bent, it is preferable that the retroreflective surface 20A have a structure which does not much affect the retroreflectance by the bending. As such a retroreflective surface 20A, for example, a structure in which spherical members are dispersed on the base material can be adopted.

Next, referring to FIGS. 5 and 6, a configuration example of the reflector plates in direction D1 intersecting direction D2 will be described.

FIG. 5 is an illustration showing another configuration example of the display device 1.

In the present configuration example, the display device 1 is accommodated in a box-shaped frame FR. The frame FR comprises inner wall surfaces 51 to 55. The inner wall surfaces 53 and 54 are opposed to each other in direction D5, the display module DSP is arranged on a side closer to the inner wall surface 54, and the reflective element RF is arranged on a side closer to the inner wall surface 53. The inner wall surfaces 51 and 52 are opposed to each other in direction D1, and are connected to the inner wall surfaces 53 and 54. The inner wall surface 55 is opposed to the optical element 10 not shown in the figure, and is connected to the inner wall surfaces 51 to 54. From the standpoint of suppressing stray light inside the display device 1, preferably, the inner wall surfaces 51 to 55 should have light absorbency.

The reflective element RF includes an end surface RFe on a side closer to the inner wall surface 51, and an end surface RFf on a side closer to the inner wall surface 52. An end surface RFc is arranged close to the inner wall surface 53, and an end surface RFd is arranged close to the inner wall surface 55. An outer surface RFb is projected toward the inner wall surfaces 53 and 55, and an inner surface RFa is convex with respect to the optical element 10. However, the reflective element RF is not bent in direction D1. In other words, the end surfaces RFe and RFf are opposed to each other in direction D1, and their central portions are arranged to be curved such that they are separated from the display module DSP and the optical element 10.

FIG. 6 is an illustration showing a configuration example of the reflective element RF shown in FIG. 5.

The reflective element RF comprises reflector plates 20, 60, and 70. The reflector plates 70, 20, and 60 are arranged in direction Dl in this order. The reflector plate 20 includes end portions 20E and 20F on both sides of the retroreflective surface 20A in direction D1. The end portion 20E is located on a side closer to the end surface RFe, and the end portion 20F is located on a side closer to the end surface RFf. The reflector plate 60 similarly includes end portions 60E and 60F on both sides of the retroreflective surface 60A, and the reflector plate 70 also includes end portions 70E and 70F on both sides of the retroreflective surface 70A. The end portions 60F and 70E are arranged in direction D1, and each of them is opposed to the reflector plate 20 in direction D3, and is opposed to the display module DSP or the optical element 10 with the reflector plate 20 interposed therebetween. The end portion 60F overlaps the end portion 20E in direction D3, and is more separated from the display module DSP or the optical element 10 than the end portion 20E is. The end portion 70E overlaps the end portion 20F in direction D3, and is more separated from the display module DSP or the optical element 10 than the end portion 20F is. The retroreflective surfaces 60A and 70A are more separated from the display module DSP or the optical element 10 in direction D3 than the retroreflective surface 20A is. Note that a pointing end of an arrow indicating direction D3 is directed toward the display module DSP or the optical element 10 as seen from reflective element RF, as shown in FIGS. 1 to 5.

In one example, the reflector plate 20 corresponds to a first reflector plate, the reflector plate 60 corresponds to a second reflector plate, and the reflector plate 70 corresponds to a third reflector plate. The retroreflective surface 20A corresponds to a first retroreflective surface, the retroreflective surface 60A corresponds to a second retroreflective surface, and the retroreflective surface 70A corresponds to a third retroreflective surface. The end portion 20E corresponds to a first end portion, the end portion 20F corresponds to a second end portion, the end portion 60F corresponds to a third end portion, and the end portion 70E corresponds to a fourth end portion.

In a plan view shown in FIG. 6, the end portion 60F of the reflector plate 60 and the end portion 70E of the reflector plate 70 are both located at the back of the reflector plate 20. When the positional relationship between the display module DSP and the reflective element RF shown in FIG. 5 is focused, the end portions 60F and 70E are located at a side more separated from the display module DSP than the reflector plate 20 is.

As described above, in the present configuration example, while end portions of a plurality of reflector plates arranged in direction D1 overlap one another, the reflector plate that is located closer to the center in direction D1 is close to the optical element 10, and the reflector plates that are located closer to the end surfaces RFe and RFf are separated from the optical element 10. The display light L1 is not reflected by the inner wall surfaces 51 and 52, but is reflected by the optical element 10. Accordingly, when the display light L1 enters the reflective element RF, the amount of light which is emitted from the inner side (i.e., the reflector plate 20) toward the outer side (i.e., the sides close to the end surfaces RFe and RFf) in direction D1 is greater than the amount of light incident from the outer side toward the inner side in direction D1. Thus, according to the present configuration example, defective image formation including streaks caused by joints between the reflector plates 20, 60, and 70 can be suppressed.

Next, a configuration example of the display module DSP in the display device 1 according to the present embodiment will be described referring to FIGS. 7 and 8, and a configuration example of the reflector plate 20 will be described referring to FIGS. 9 and 10.

FIG. 7 is an illustration showing a configuration example of the display panel PNL.

In the example illustrated, the display panel PNL is shaped like a rectangle having end portions extending in directions X and Y.

An active-matrix-driving transmissive liquid crystal display panel will be described as an example of the display panel PNL. The display panel PNL includes a first substrate SUB1, a second substrate SUB2 opposed to the first substrate SUB1, and a liquid crystal layer LQ held between the first substrate SUB1 and the second substrate SUB2. The first substrate SUB1 and the second substrate SUB2 are adhered to each other with a predetermined cell gap formed therebetween. The display panel PNL includes a display area DA where an image is displayed. The display area DA includes sub-pixels PX arrayed in a matrix.

The display area DA includes, for example, a red pixel PXR which displays red, a green pixel PXG which displays green, and a blue pixel PXB which displays blue, as the sub-pixels PX. It should be noted that the display area DA may further include a sub-pixel of a color different from red, green and blue (for example, a white pixel which displays white). A pixel for realizing color display is constituted of these sub-pixels PX of different colors. That is, the pixel is the minimum unit which constitutes a color image. In the example illustrated, the pixel is constituted of the red pixel PXR, the green pixel PXG, and the blue pixel PXB.

The red pixel PXR includes a red color filter, and is formed to transmit mainly red light of white light from a light source device. The green pixel PXG includes a green color filter, and is formed to transmit mainly green light of the white light from the light source device. The blue pixel PXB includes a blue color filter, and is formed to transmit mainly blue light of the white light from the light source device. Further, the color filters may be formed on the first substrate SUB1 or the second substrate SUB2 though not explained in detail.

The first substrate SUB1 includes gate lines G extending along direction X, and source lines S extending along direction Y and intersecting the gate lines G. Each of the gate lines G is drawn outside the display area DA and is connected to a gate driver GD. Each of the source lines S is drawn outside the display area DA and is connected to a source driver SD. The gate driver GD and the source driver SD are connected to a controller CNT. The controller CNT generates a control signal, based on a video signal, to control the gate driver GD and the source driver SD.

Each of the sub-pixels PX includes a switching element SW, a pixel electrode PE, a common electrode CE, and the like. The switching element SW is electrically connected to the gate line G and the source line S. The switching element SW is composed of, for example, a thin-film transistor. The pixel electrode PE is electrically connected to the switching element SW. The common electrode CE is opposed to each of a plurality of pixel electrodes PE.

Although the details of the configuration of the display panel PNL will not be described here, in a display mode using a longitudinal electric field formed along the normal line of the main surface of the substrate or a display mode using an oblique electric field which is tilted obliquely with respect to the normal line of the main surface of the substrate, the pixel electrode PE is disposed on the first substrate SUB1 while the common electrode CE is disposed on the second substrate SUB2. In addition, both the pixel electrode PE and the common electrode CE are disposed on the first substrate SUB1 in a display mode using a lateral electric field formed along the main surface of the substrate. Furthermore, the display panel PNL may have a structure corresponding to a display mode using an arbitrary combination of the longitudinal, lateral, and oblique electric fields. Note that in the example illustrated, the main surface of the substrate corresponds to an X-Y plane defined by direction X and direction Y.

Figure 8:
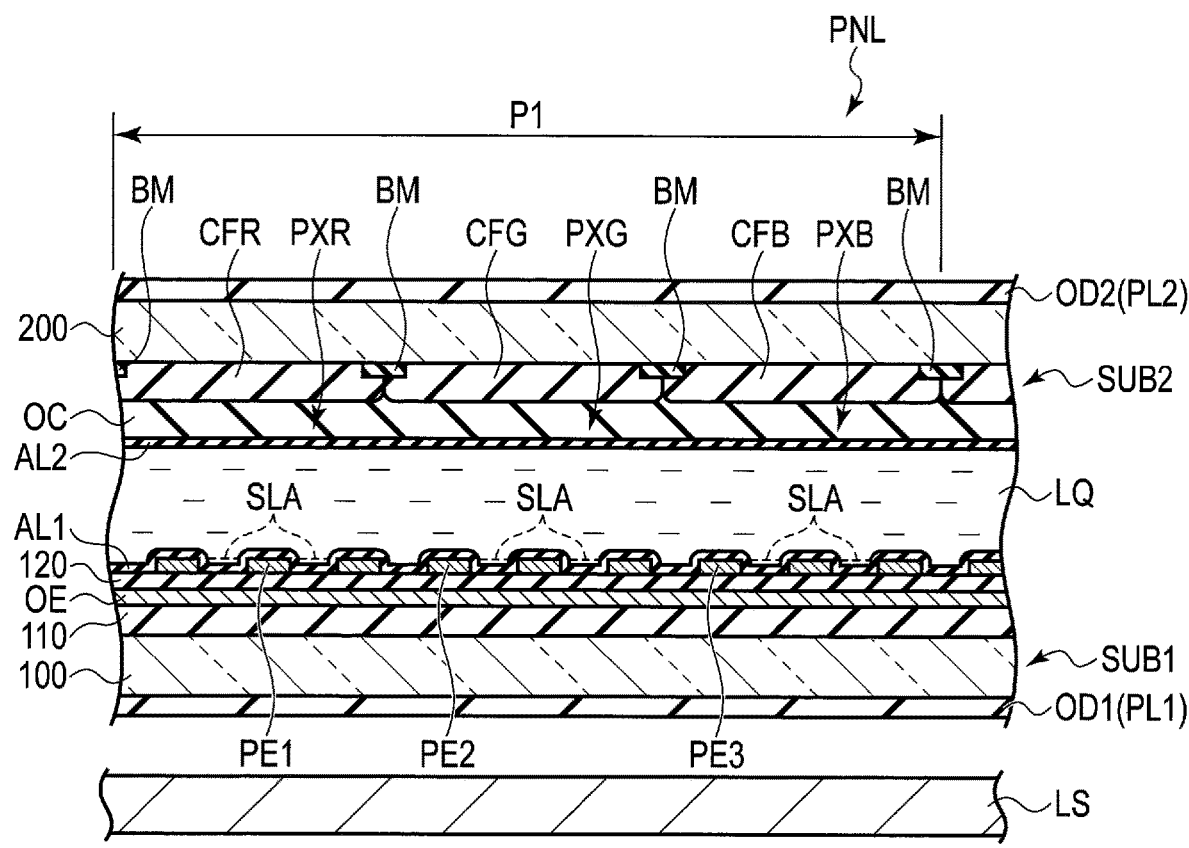
FIG. 8 is a cross-sectional view showing a configuration example of a display module DSP.

FIG. 8 is a cross-sectional view showing a configuration example of the display module DSP.

A cross-sectional structure of the display panel PNL adopting a fringe field switching (FFS) mode which is one of the display modes using the lateral electric field will be explained briefly.

The first substrate SUB1 includes a first insulating substrate 100, a first insulating film 110, the common electrode CE, a second insulating film 120, pixel electrodes PE1 to PE3, a first alignment film AL1, and the like. The common electrode CE extends over the red pixel PXR, the green pixel PXG, and the blue pixel PXB. Each of the pixel electrode PE1 of the red pixel PXR, the pixel electrode PE2 of the green pixel PXG, and the pixel electrode PE3 of the blue pixel PXB is opposed to the common electrode CE, and includes slits SLA. In the example illustrated, the common electrode CE is located between the first insulating film 110 and the second insulating film 120, and the pixel electrodes PE1 to PE3 are located between the second insulating film 120 and the first alignment film AL1. Alternatively, the pixel electrodes PE1 to PE3 may be located between the first insulating film 110 and the second insulating film 120, and the common electrode CE may be located between the second insulating film 120 and the first alignment film AL1. In this case, the slits SLA are formed in the common electrode CE.

The second substrate SUB2 includes a second insulating substrate 200, a light-shielding layer BM, color filters CFR, CFG and CFB, an overcoat layer OC, a second alignment film AL2, and the like. The color filters CFR, CFG and CFB are opposed to the pixel electrodes PE1 to PE3, respectively, with the liquid crystal layer LQ interposed therebetween. The color filter CFR is a red color filter, the color filter CFG is a green color filter, and the color filter CFB is a blue color filter. Note that, although the color filters CFR, CFG and CFB are formed on the second substrate SUB2 in the example illustrated, they may be formed on the first substrate SUB1. The liquid crystal layer LQ is sealed between the first alignment film AL1 and the second alignment film AL2.

A first optical element OD1 including a first polarizer PL1 is disposed on an outer surface of the first insulating substrate 100. A second optical element OD2 including a second polarizer PL2 is disposed on an outer surface of the second insulating substrate 200. For example, a first absorption axis of the first polarizer PL1 and a second absorption axis of the second polarizer PL2 are orthogonal to each other.

The pixels each composed of the red pixel PXR, the green pixel PXG, and the blue pixel PXB are arrayed at a pitch P1.

Next, a structure of a retroreflective surface of the reflector plate 20 will be described. While the so-called corner reflector structure having three reflective surfaces that are orthogonal to each other is described in the present specification, the structure of the reflector plate 20 is not particularly limited. That is, a structure having a spherical refractive surface and a spherical reflective surface may also be adopted.

FIG. 9 is an illustration showing a configuration example of the reflector plate 20.

This figure illustrates the retroreflective surface 20A as seen in plan view. The retroreflective surface 20A extends in the D1-D2 plane defined by directions D1 and D2 crossing each other. Although directions D1 and D2 are orthogonal to each other in the example illustrated, they may cross each other at an angle other than 90°. Further, direction D3 is the normal direction of the D1-D2 plane.

The reflector plate 20 comprises a plurality of reflectors 25. In the plan view illustrated, each of the reflectors 25 is shaped in a regular triangle. A top part 20H is located on each of three sides surrounding an area corresponding to the reflector 25, and a bottom part 20L is located at the center of the reflector 25. The bottom part 20L is recessed toward the back of the plane of the drawing, and the reflector 25 comprises three reflective surfaces M1 to M3 which extend radially from the bottom part 20L. Each of the reflective surfaces M1 to M3 is located in a triangular region formed by connecting one side of the top parts 20H extending in mutually different directions and the bottom part 20L.

The reflective surfaces M1 to M3 are all formed in the same shape, and are adjacent to each other. For example, the reflective surfaces M1 and M2 are adjacent to each other at a boundary B1, and are symmetric to each other with respect to the boundary B1. The reflective surfaces M2 and M3 are adjacent to each other at a boundary B2 extending in direction D2, and are symmetric to each other with respect to the boundary B2. The reflective surfaces M3 and M1 are adjacent to each other at a boundary B3, and are symmetric to each other with respect to the boundary B3. Each of the reflective surfaces M1 to M3 has a right-angled corner portion at the bottom portion 20L. Also, these reflective surfaces M1 to M3 are orthogonal to each other. The retroreflective surface 20A constituted of the reflective surfaces M1 to M3 of such a shape is called a corner cube or a corner reflector. An air layer, or a protection member which protects the reflective surfaces M1 to M3 is located at an inner side surrounded by the three reflective surfaces M1 to M3. In the reflector 25, since incident light is reflected by each of the three reflective surfaces M1 to M3, retroreflection in which the light is reflected back in substantially the same optical path as that of the incident light is realized.

In the example illustrated, the reflectors 25 are arrayed in direction D1. The reflectors 25 are also arrayed at a pitch P2 in direction D2. However, the reflectors 25 adjacent to each other in directions D1 and D2 have shapes inverted relative to each other by 180 degrees.

The resolution of the display image I1 depends on the pitch P2 of the reflector 25. In order to suppress deterioration in the resolution, the pitch P2 should preferably be smaller than the pitch P1 of the pixels in the display panel PNL shown in FIG. 8.

FIG. 10 is a cross-sectional view of the reflector plate 20 taken along line X-X' shown in FIG. 9. In the example illustrated, the top parts 20H are located at a more interior side of the display device 1 than the bottom part 20L. The corner reflector formed by the reflective surfaces M1 to M3 of the retroreflective surface 20A is recessed relative to a horizontal plane H shown by a broken line in the figure (i.e., a plane parallel to the D1-D2 plane). The horizontal plane H is a plane including the top parts 20H. The bottom part 20L is located closer to a back surface 20B than the horizontal plane H is. However, if the base material 21 is structured to be located at the inner side of the display device 1, it is possible to assume that the corner reflector is projected relative to the horizontal plane H. In other words, when the base material 21 is located at the inner side of the display device 1, the bottom part 20L is located at a more interior side of the display device 1 than the top parts 20H. A cross-section defined by the horizontal plane H and the retroreflective surface 20A represents a right-angled triangle. An angle formed between the reflective surface M1 and the boundary B2 is 90°, and the horizontal plane H corresponds to the hypotenuse. Angle $\theta\alpha$ formed between the reflective surface M1 and the horizontal plane H is about 54.7°.

In one example, when the pitch P1 of the pixels in the display panel PNL is 200 μm, the pitch P2 of the reflector 25 in the reflector plate 20 is 180 μm, and the pitch P2 is smaller than the pitch P1. Also, the retroreflective surface 20A has a depth d in direction D3 corresponding to the normal direction of the horizontal plane H. The depth d is, for example, 73.5 μm. Note that a thickness t of the metallic thin film 22 is substantially uniform over the entire surface of the retroreflective surface 20A, and is sufficiently small as compared to the depth d. In one example, the thickness t is 150 nm. For this reason, when the metallic thin film 22 is formed, the surface 21A of the base material 21 conforming to the retroreflective surface 20A cannot be buried by the metallic thin film 22 or deform the retroreflective surface 20A.

Next, a modification in which the reflector plates 20 and 30 are formed as a continuous single member will be described. Also in the modification described below, advantages similar to those described above can be obtained.

FIG. 11 is an illustration showing a modification of the reflective element RF.

A single base material BF includes a first region BF1 and a second region BF2. The retroreflective surface 20A is formed on the first region BF1 of the base material BF, and the reflector plate 20 is thus formed. Further, the retroreflective surface 30A is formed on the second region BF2 of the base material BF, and the reflector plate 30 is thus formed. In other words, the reflector plates 20 and 30 are connected to each other via the single base material BF. A boundary portion 90 is located between the retroreflective surface 20A and the retroreflective surface 30A. The boundary portion 90 is a region corresponding to edges (or a joint) of molds which have been tiled in forming the retroreflective surfaces 20A and 30A by mold machining. Alternatively, the boundary portion 90 corresponds to a gap between the reflector plate 20 and the reflector plate 30 when the reflector plate 20 and the reflector plate 30 are attached to each other on the base material BF. The boundary portion 90 may be for example, an irregular reflection surface, a specular reflection surface, or a light absorption surface.

The retroreflective surface 20A includes a bent portion C1, which is bent in a convex shape toward the side separated from the optical element 10 (or in a concave shape as seen from the optical element 10), at a position adjacent to the boundary portion 90. The retroreflective surface 30A includes a bent portion C2, which is bent in a convex shape toward the side close to the optical element 10 (or in a convex shape as seen from the optical element 10), at a position adjacent to the boundary portion 90. In other words, the boundary portion 90 is located between the bent portion C1 and the bent portion C2. The bent portion C1 is obtained by bending the base material BF which is shaped like a flat plate at a bending angle θ5. The bending angle θ5 is an obtuse angle greater than 90 degrees, for example. The bent portion C2 is obtained by bending the plate-like base material BF at a bending angle θ6. The bending angle θ6 is an acute angle less than 90 degrees, for example. The bent portion C2 is located directly above the bent portion C1 along direction D3 with the boundary portion 90 interposed therebetween. The bent portion C2 is located on an optical path of the display light L1 between the boundary portion 90 and the optical element 10. In the example illustrated, the base material BF is bent in the form of letter Z with the boundary portion 90 at the center, and both the reflector plates 20 and 30 are bent and opposed to each other in direction D3. The reflector plate 20, which is closer to the end surface RFc than from the reflector plate 30, is closer to the outer surface RFb than the reflector plate 30 is, and the reflector plate 30, which is closer to the end surface RFd than from the reflector plate 20, is closer to the inner surface RFa than the reflector plate 20 is. The boundary portion 90 is located between the reflector plate 20 and the reflector plate 30 in direction D3. Incidence of the display light L1 on the boundary portion 90 can thereby be reduced.

In one example, the retroreflective surface 20A corresponds to a first retroreflective surface, and the retroreflective surface 30A corresponds to a second retroreflective surface. The bent portion C1 corresponds to a first bent portion, and the bent portion C2 corresponds to a second bent portion.

Also in such a modification, advantages similar to those described above can be obtained.

As described above, according to the present embodiment, a display device capable of suppressing deterioration in display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display module which emits display light;
an optical element which transmits or reflects the display light; and
a reflective element which retroreflects the display light reflected from the optical element,
the reflective element comprising:
a first reflector plate including
  a first side of the first reflector plate,
  a second side of the first reflector plate,
  a first retroreflective surface with retroreflective properties between the first side and the second side, the first retroreflective surface facing the optical element,
  a first flat surface of the first reflector plate, the first flat surface being on an opposite side to the first retroreflective surface,
  a first end portion of the first retroreflective surface along the first side, and
  a second end portion of the first retroreflective surface along the second side; and
a second reflector plate including
  a third side of the second reflector plate,
  a fourth side of the second reflector plate,
  a second retroreflective surface with retroreflective properties between the third side and the fourth side, the second retroreflective surface facing the optical element,
  a second flat surface of the second reflector plate, the second flat surface being on an opposite side to the second retroreflective surface,
  a third end portion of the second retroreflective surface along the third side, and
  a fourth end portion of the second retroreflective surface along the fourth side, wherein
the first flat surface is foiined from the first side to the second side of the first reflector plate,
the second flat surface is formed from the third side to the fourth side of the second reflector plate,
a distance between the second end portion and the optical element is greater than a distance between the first end portion and the optical element,
a distance between the fourth end portion and the optical element is greater than
a distance between the third end portion and the optical element,
the distance between the second end portion and the optical element is greater than the third end portion and the optical element,
the third end portion of the second retroreflective surface overlaps the second end portion of the first retroreflective surface,
the second end portion of the first retroreflective surface faces the second flat surface of the second reflector plate.

2. The display device of Claim 1, wherein:
the display module includes a display surface;
the optical element includes a first outer surface; and
an angle formed between the display surface and the first outer surface is greater than or equal to 45° and less than 90°.

3. The display device of claim 1, wherein:
the optical element includes a first outer surface;
the reflective element includes a second outer surface; and
an angle formed between the first outer surface and the second outer surface is greater than 0° and smaller than 45°.

4. A display device comprising:
a display module which emits display light;
an optical element which transmits or reflects the display light; and
a reflective element which retroreflects the display light reflected from the optical element,
the reflective element comprising:
a first reflector plate including
  a first side of the first reflector plate,
  a second side of the first reflector plate,
  a first retroreflective surface with retroreflective properties which is bent in a convex shape toward the optical element between the first side and the second side; and
  a first end portion of the first retroreflective surface along the first side, and
  a second end portion of the first retroreflective surface along the second side;
and
a second reflector plate including
  a third side of the second reflector plate,
  a fourth side of the second reflector plate,
  a second retroreflective surface with retroreflective properties which is bent in a convex shape toward the optical element between the third side and the fourth side,
  a third end portion of the second retroreflective surface along the third side, and
  a fourth end portion of the second retroreflective surface along the fourth side,
wherein
  a distance between the second end portion and the optical element is greater than a distance between the first end portion and the optical element,
  a distance between the fourth end portion and the optical element is greater than a distance between the third end portion and the optical element,
the first retroreflective surface forms a single convex portion, without any concave portion between the first side and the second side,
the second retroreflective surface forms a single convex portion without any concave portion between the third side and the fourth side, and
the second end portion of the first retroreflective surface faces the third end portion of the second retroreflective surface.

5. The display device of claim 4, wherein:
the display module includes a display surface;
the optical element includes a first outer surface; and
an angle formed between the display surface and the first outer surface is greater than or equal to 45° and less than 90°.

6. The display device of claim 4, wherein:
the optical element includes a first outer surface;
the reflective element includes a second outer surface; and
an angle formed between the first outer surface and the second outer surface is greater than 0° and smaller than 45°.

7. The display device of claim 4, wherein
the first retroreflective surface has a vertex, and
a distance between the vertex and the first end portion is less than a distance between the vertex and the second end portion.

8. A display device comprising:

a display module which emits display light;

an optical element which transmits or reflects the display light; and a reflective element including a first end extending in a first direction, a second end extending in the first direction, an inner surface which retroreflects the display light reflected from the optical element between the first end and the second end, a distance between the first end and the display module being greater than a distance between the second end and the display module, the inner surface being concave with respect to the display module, the reflective element comprising:

a first reflector plate including a first retroreflective surface with retroreflective properties, a non-retroreflective surface on an opposite side to the first retroreflective surface, a first end portion, and a second end portion, the first end portion and the second end portion being on both sides of the first retroreflective surface in the first direction;

a second reflector plate including a third end portion, which overlaps the first end portion and is more separated from the display module than the first end portion, and a second retroreflective surface with retroreflective properties; and a third reflector plate including a fourth end portion, which overlaps the second end portion and is more separated from the display module than the second end portion, and a third retroreflective surface with retroreflective properties, wherein the second reflector, the first reflector, and the third reflector are arranged in the first direction in this order, the first retroreflective surface, the second retroreflective surface, and the third retroreflective surface form the inner surface, the first reflector is closer to the optical element, the second reflector and the third reflector are separated from the optical element, and the third end portion of the second retroreflective surface and the fourth end portion of the third retroreflective surface face the non-retroreflective surface of the first reflector plate.

9. The display device of claim 8, wherein:

the display module includes a display surface;

the optical element includes a first outer surface; and an angle formed between the display surface and the first outer surface is greater than or equal to 45° and less than 90°.

10. The display device of claim 8, wherein:

the optical element includes a first outer surface;

the reflective element includes a second outer surface; and an angle formed between the first outer surface and the second outer surface is greater than 0° and smaller than 45°.

* * * * *